(12) United States Patent
Tysso

(10) Patent No.: US 8,345,082 B2
(45) Date of Patent: Jan. 1, 2013

(54) SYSTEM AND ASSOCIATED METHODOLOGY FOR MULTI-LAYERED SITE VIDEO CONFERENCING

(75) Inventor: Jorunn Tysso, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 639 days.

(21) Appl. No.: 12/576,018

(22) Filed: Oct. 8, 2009

(65) Prior Publication Data

US 2010/0171807 A1    Jul. 8, 2010

Related U.S. Application Data

(60) Provisional application No. 61/103,588, filed on Oct. 8, 2008.

(51) Int. Cl.
*H04N 7/14* (2006.01)
(52) U.S. Cl. ............... 348/14.08; 348/14.09; 348/14.12
(58) Field of Classification Search ..... 348/14.01–14.16
See application file for complete search history.

(56) References Cited

U.S. PATENT DOCUMENTS

| | | | |
|---|---|---|---|
| 6,195,116 B1* | 2/2001 | Lee | 348/14.09 |
| 6,304,648 B1* | 10/2001 | Chang | 379/202.01 |
| 6,798,407 B1* | 9/2004 | Benman | 345/419 |
| 7,982,762 B2* | 7/2011 | Chatting et al. | 348/14.07 |
| 2002/0093531 A1* | 7/2002 | Barile | 345/753 |
| 2006/0244817 A1* | 11/2006 | Harville et al. | 348/14.08 |

* cited by examiner

*Primary Examiner* — Melur Ramakrishnaiah
(74) *Attorney, Agent, or Firm* — Oblon, Spivak, McClelland, Maier & Neustadt, L.L.P.

(57) ABSTRACT

A video conferencing system with more than three endpoints and a multipoint control unit displays a merged image of the video conference participants at an endpoint monitor. The participant images are separated from their corresponding background and merged to make all participants appear the same size on the monitor. The system also identifies an active endpoint based on the level of sound received from the endpoints and highlights a corresponding participant as a speaker.

21 Claims, 4 Drawing Sheets

SYSTEM AND ASSOCIATED METHODOLOGY FOR MULTI-LAYERED SITE VIDEO CONFERENCING

CROSS-REFERENCE TO RELATED APPLICATIONS

The present application is based upon and claims the benefit of priority from U.S. Application No. 61/103,588 entitled "Layered Multi-Site" and filed on Oct. 8, 2008, the entire contents of which are incorporated herein by reference.

BACKGROUND

The present invention relates generally to video conferencing and more specifically to a system and associated methodology for presenting several participants located at different endpoints on a single monitor using a dynamic layered multi-site video conferencing system.

In a conventional video conferencing system, participants are represented in a video stream displayed in its entirety on a video endpoint. When more than two sites are communicating with each other, the sites are either shown one after another, such as in voice switching, or in matrix form spread over on one or multiple monitors. However, participants in such video conferences frequently experience issues that prevent video conferencing from becoming a standard form of communication.

For example, each participant is displayed in a separate 'window' rather than displayed as being in a same room. Participants are also scaled differently so that participants sharing a single site, such as when several participants are located in a single meeting room, are displayed in a smaller scale than participants that do not share a common site, such as those joining from a personal endpoint. Additionally, the appearances of the participants are confined within the borders of their respective video streams displayed on the monitor, making all participants appear smaller than the monitor screen would potentially allow, and the above-described problems are exacerbated as more sites are presented on the display. This also makes it harder to identify a participant that is currently speaking.

The experienced quality of a video conference is defined by the degree of "natural communication" or tele-presence. This includes optimal eye contact, sensation of being in the same room, life size representation of participants, and being focused on the same discussion. Eye contact, for example, plays a large role in conversational turn-taking, perceived attention and intent, and other aspects of group communication. However, video conferencing systems may provide an incorrect impression that the remote interlocutor is avoiding eye contact.

Further, when more than one site (endpoint) is introduced on a monitor at the same time, the immersive sensation of the video is diminished since the participants displayed on the monitor are often represented differently. Hence, a traditional multisite video conference has poor quality in terms of experienced natural communication or tele-presence.

SUMMARY

In view of the foregoing, the present advancements provide a system and associated methodology for displaying participants to a video conference as being located in a single room though the participants may be situated at different physical locations.

A method to cause a video conferencing system to display a plurality of participants, is provided. The method includes receiving, at a multipoint control unit, video data including sound and image data from a plurality of endpoints connected to the multipoint control unit, where the video data corresponds to participants located at each of the plurality of endpoints. The method also includes extracting, at the multipoint control unit, participant image data from the sound and image data included in the video data, and processing, at the multipoint control unit, the extracted participant image data to have a same appearance. In addition, the processed participant image data is merged in the multipoint control unit to generate a merged image data of participants from other endpoints. The merged image data excludes surrounding background image data corresponding to each of the participants. Once merged, the merged image data is transmitted from the multipoint control unit to a respective endpoint. The merged image data is then displayed at a monitor of the respective endpoint, and the monitor displays participants from other endpoints as being located in a same room.

Other objects, features and advantages of the present disclosure will be fully understood from the following detailed description of exemplary embodiments of the invention in conjunction with the accompanying drawings.

BRIEF DESCRIPTION OF THE DRAWINGS

A more complete appreciation of the inventions and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification. The scope of the inventions embraced by the specification and drawings are defined by the words of the accompanying claims.

DETAILED DESCRIPTION

The system and associated methodology according to the present disclosure displays a plurality of participants in a video conference on a single monitor in such a way that participants located at least three different endpoints appear to be located in the same room. More specifically, the system and associated methodology merge video images from each end point in such a way that the participants appear to be sitting in the same room, and the person currently talking is highlighted on the monitor.

Simultaneous videoconferencing among three or more remote points (multipoint videoconferencing) is made possible using a multipoint control unit (MCU) to bridge or interconnect calls from several sources. All participants to the video conference may call the MCU unit, or alternatively the MCU unit may call the participants, in order to establish the video conference. The MCU establishes video conferences over IP and ISDN-based networks in preferred aspects, which including implementations in hardware, software or both, as will be described in detail below.

Figure 1:
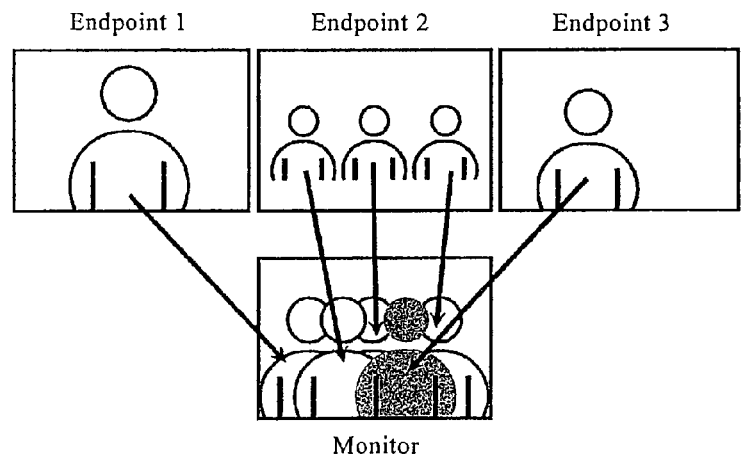
FIG. 1 is a diagram of combining participant image data of participants situated at different locations to display the participants of a video conference as being located in a same room, in accordance with an exemplary embodiment of the present disclosure.

FIG. 1 is a diagram of merging multiple video conference participants situated at different locations into a merged image data to display the participants as being located in a same room on an endpoint monitor. As used herein, an "endpoint" is a hardware, software or hardware/software device used by participants to take part in a video conference. As such, devices capable of capturing an image, communicating over a network and displaying an image is suitable as an endpoint, as one of ordinary skill in the art will recognize. An endpoint according to an exemplary embodiment of the present disclosure is described in detail below.

In FIG. 1, endpoints 1 and 3 include only one participant, while endpoint 2 includes three participants. Therefore, participant images from endpoints 1 and 3 are sized differently from the participant images from endpoint 2. As indicated by the arrows in FIG. 1, the participant images from endpoints 1-3 are scaled to have a same size and merged for display on monitor 4. The participant images are also overlapped and aligned horizontally so that participants appear to be located in a same room when displayed on monitor 4. As recognized by one of ordinary skill in the art, the participant images can also be processed to have a same contrast, color balance, intensity and the like.

Figure 2:
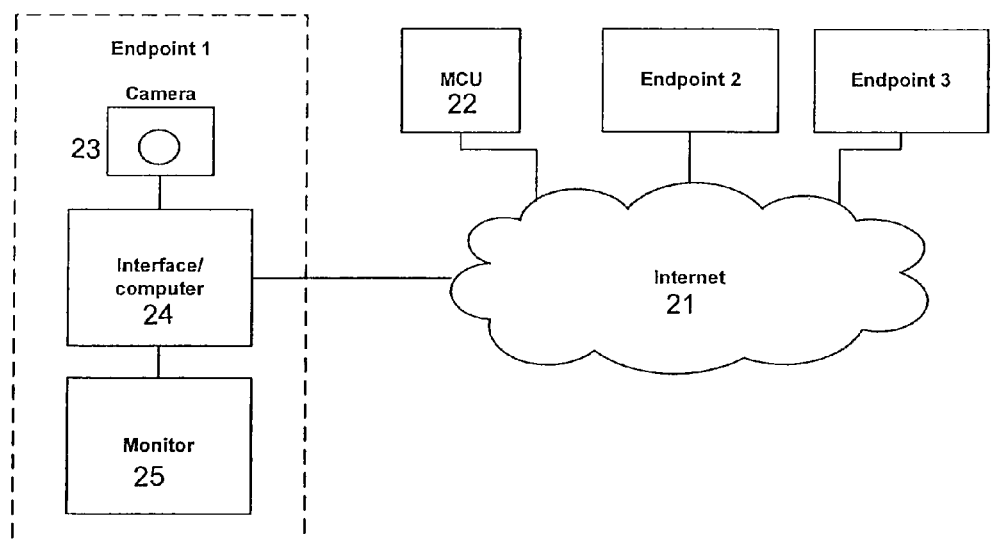
FIG. 2 is a schematic drawing of a video conferencing system according to an exemplary embodiment of the present disclosure.

FIG. 2 is a block diagram of a video conferencing system according to an exemplary embodiment of the present disclosure. In FIG. 2, endpoints 1-3 are connected to MCU 22 via network 21.

Though network 21 is shown as the Internet, network 21 may also be a wide area network (WAN), a wireless wide area network (WWAN) or a circuit-switched telephone network, such as an Integrated Services Digital Network (ISDN). The network 21 may also be a public network such as the Internet, a hybrid network (partly public and partly private) or a dedicated network. If the network 21 is wireless, radio network access can include Global System for Mobile Communication (GSM), General Packet Radio Services (GPRS), Enhanced Data GSM Environment (EDGE), Code Division Multiple Access (CDMA), 3G, 4G and the like. Other networks, whose descriptions are omitted here for brevity, may also be used in conjunction with the system of FIG. 2 without departing from the scope of the present advancement.

In FIG. 2, each endpoint 1-3 sends image and sound data of the participants in a video conference to the MCU 22, and the MCU 22 processes the data before sending the resulting processed data to respective endpoints 1-3. The video data from the endpoint 1-3 receiving the processed video data is not included in the merged image. For example, the merged data sent to endpoint 1 includes participant image data from endpoints 2 and 3, but not from endpoint 1. However, in an alternative embodiment the merged data includes participant image data from all endpoint 1-3 irrespective of the endpoint 1-3 receiving the data, as one of ordinary skill will recognize.

In FIG. 2, each endpoint 1-3 include at least a camera 23 to record participant images, a computer 24 or other data processing device, and a monitor 25 to display the merged data.

Figure 3:
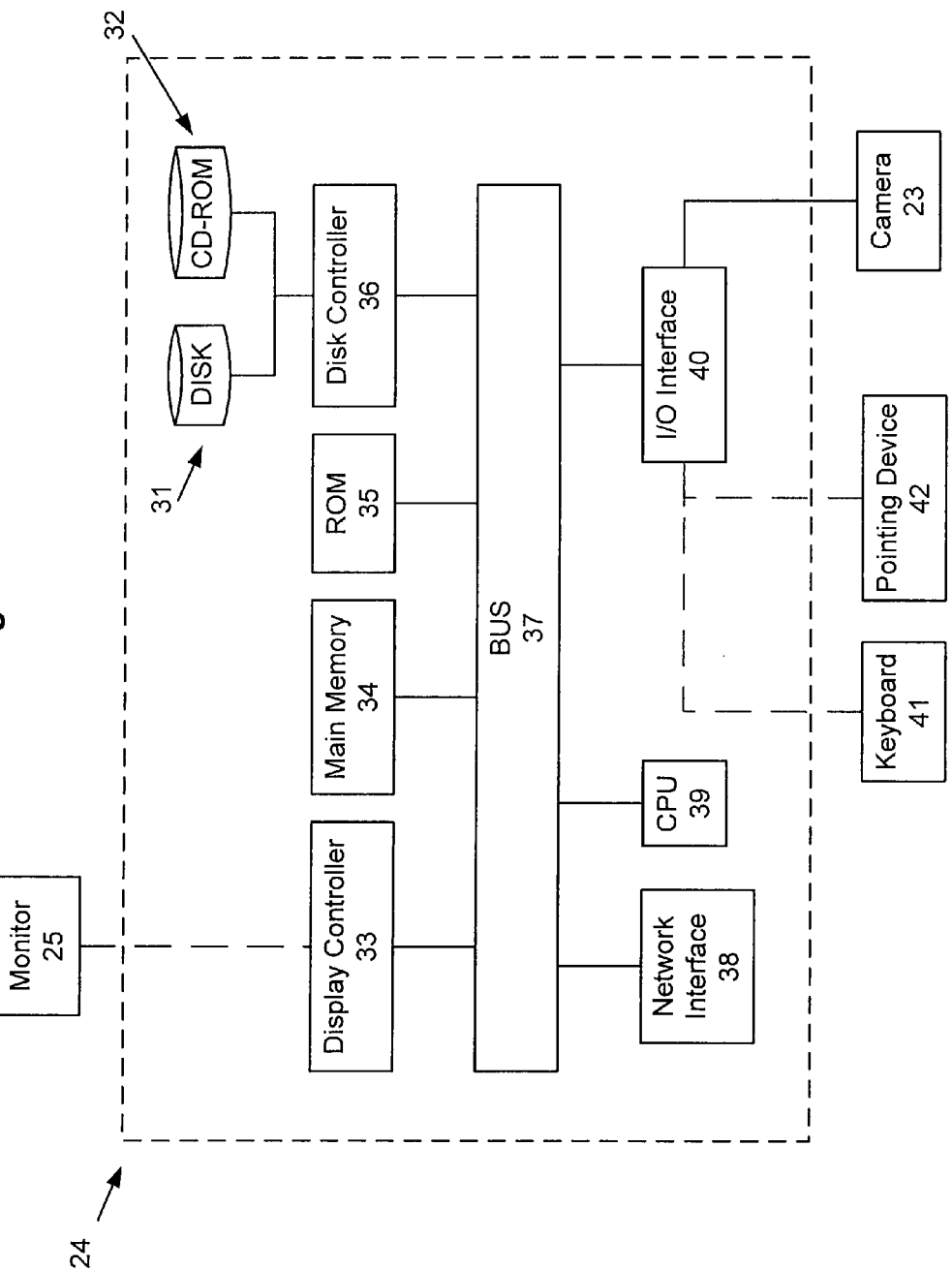
FIG. 3 is a block diagram of an endpoint in accordance with an exemplary embodiment of the present disclosure.

FIG. 3 is a block diagram of the computer 24 included in the endpoints 1-3. Each endpoint 1-3 includes a CPU 39, which processes data and instructions stored in main memory 34 and/or ROM 35. The CPU 39 also processes information stored on the disk 31 or CD-ROM 32. The exemplary CPU 39 may be an Intel Pentium processor or Core2Duo processor from Intel of America. Of course, other processor and hardware vendors and types are known in the art such as Freescale ColdFire, i.MX and ARM processors from Freescale Corporation of America. Thus, instructions corresponding to a process for displaying a plurality of participants to a video conference in accordance with exemplary aspects of the present disclosure is stored on any one of the disk 31, CD-ROM 32, main memory 34 or ROM 35.

The computer 24 also includes a network interface 38, such as a an Intel Ethernet PRO network interface card from Intel Corporation of America, for interfacing with the MCU 22 via network 21; a display controller 33, such as a NVIDIA GeForce GTX graphics adaptor from NVIDIA Corporation of America for interfacing with monitor 25, such as a Hewlett Packard HP L2445w LCD monitor; and a camera 23. The computer 24 of endpoint 1 also includes an I/O interface 40 for interfacing with a keyboard 41 and pointing device 42, such as a roller ball or mouse. Disk controller 36 interconnects disk 31, such as a hard disk drive or FLASH memory drive, and CD-ROM 32 or DVD drive with bus 37, which may be an ISA, EISA, VESA, PCI, or similar for interconnecting all of the components of the computer 24. A description of the general features and functionality of the monitor 25, keyboard 41, pointing device 42 and camera 23, as well as the display controller 33, disk controller 36, network interface 38 and I/O interface 40 are omitted for brevity as these features are well known.

The exemplary computer 24 in FIG. 3 is therefore a hardware platform of a computing device, such as a PC, and CPU 39 may for example be an Intel Pentium Processor, or any other processor known in the art. The computer-readable instructions stored on any one of the main memory 34, ROM 35, disk 31 or CD-ROM 32 may be provided as a utility application, background daemon, or component of an operating system, or combination thereof, executing in conjunction with CPU 39 and an operating system such as Microsoft VISTA, UNIX, Solaris, LINUX, Apple MAC-OS and other systems known to those skilled in the art.

Main memory 34 and/or ROM 35 supports registries and the like features of the contact enrichment server 100. As such, main memory 34 may be a random access memory (RAM), FLASH memory, EEPROM memory, or the like, while ROM 35 is Read Only Memory, such as PROMs. Further descriptions of the main memory 34 and the ROM 25 are omitted for brevity as such memory is well known.

Endpoints 1-3 may also be housed within a single device or may be implemented separately on FPGA's, ASIC's, microcontrollers, PLD's or other computer-readable mediums such as an optical disk. Endpoints 1-3 may also be implemented in dedicated hardware, such as the E20 from Tandberg Telecom, A.S. of Norway.

An MCU's support varying numbers of simultaneous calls, transpose data rates and protocols, and include features such as 'Continuous Presence', in which multiple parties can be seen on-screen at once. However, the above hardware description of endpoints 1-3 may be equally applicable to the MCU 22. As such, MCU 22 includes a CPU 39, RAM 34, ROM 35, disk 31, CD-ROM 32 and associated controlling hardware. Alternatively, MCU is implemented on FPGA's, ASIC's, microcontrollers, PLD's or other computer-readable mediums such as an optical disk. The MCU 22 may also be implemented as dedicated hardware, such as the Codian MSE 8000 from Tandberg Telecom, A.S. of Norway. As one of ordinary skill in the art will recognize other brands and models of MCU's and endpoints may also be used without departing from the scope of the present disclosure.

Figure 4:
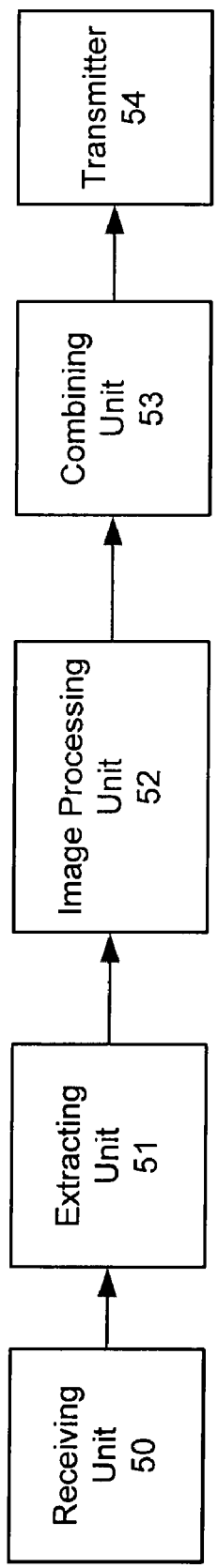
FIG. 4 is a functional diagram of a multipoint control unit according to an exemplary embodiment of the present disclosure.

Next, MCU 22 functionality according to an exemplary embodiment of the present disclosure will be described with reference to FIG. 4. In FIG. 4, the receiving unit 50 receives video data from endpoints 1-3 via network 21 as in FIG. 2. The received video data includes both image and sound data corresponding to participants respectively located near each of the endpoints 1-3. The extraction unit 51 extracts participant image data from the video data received by receiving unit 50 in order to separate the participant image data from background image data also included in the video data. The extracted participant image data is then supplied to image processing unit 52 where the participant images are scaled and processed to have a same appearance. The combining unit 53 merges the processed participant images into a merged data wherein the participant images are overlapped and a participant that is speaking is highlighted. The merged data is then supplied to the transmitter 54 for transmission to the endpoints 1-2 via network 21.

Figure 5:
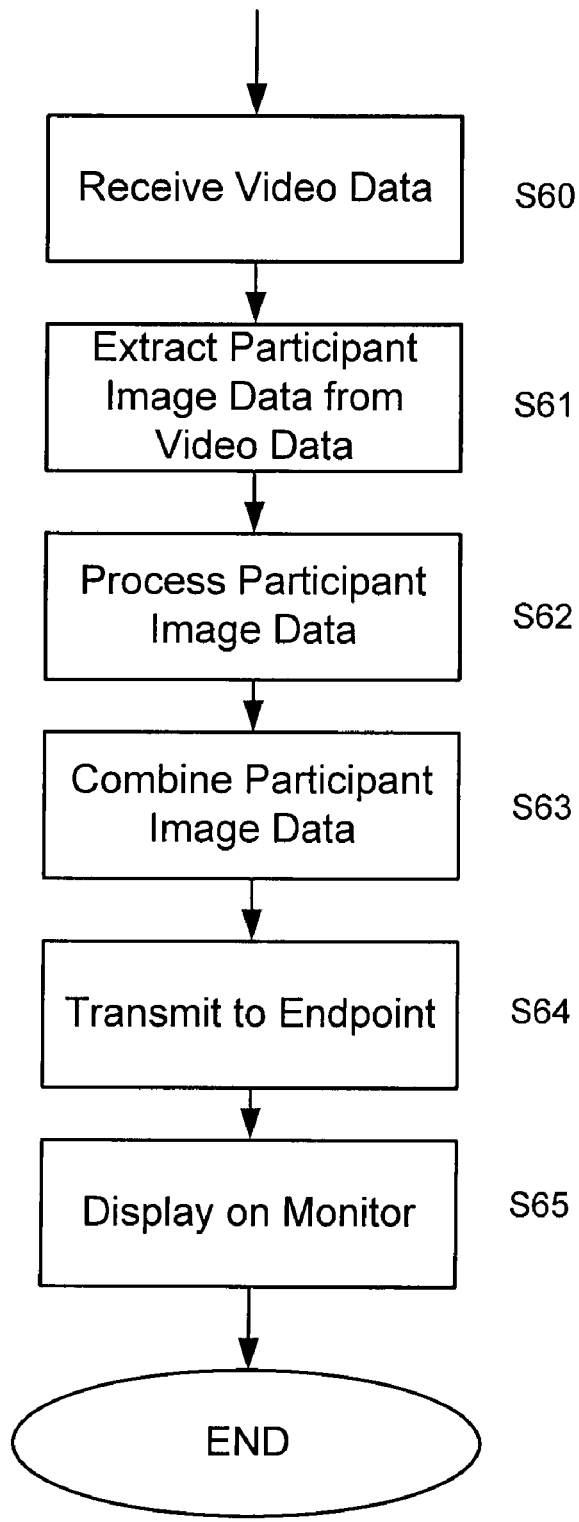
FIG. 5 is an algorithmic flowchart of displaying video conference participants situated in different locations as being located in a same room, in accordance with an exemplary embodiment of the present disclosure.

Next, a process for displaying a plurality of participant images on a single monitor is described with reference to FIG. 5. In step S60, video data from each of the endpoints 1-3 is received by the MCU 22. The video data includes data from one or more participants located at each endpoint 1-3, as well as background image data, such as the conference room. Alternatively, the video data includes only image data of the bodies of the participants when the endpoints 1-3 remove the background image data prior to transmitting the vide data to the MCU 22.

At step S61, the MCU 22 extracts the participant images from their respective backgrounds. This step further includes processing the received video data to extract each participant from their respective background surroundings so that only the bodies of the participants are included in the extracted image data.

In order to reduce the amount of data transferred from endpoints 1-3 to the MCU 22, the video data may be partly pre-processed by the endpoints 1-3 to remove background information prior to transmission of the video data to the MCU 22. In this case, the video data transmitted from the endpoints 1-3 includes only image data of the participants. Therefore step S61 may be performed at the endpoints 1-3 rather than in MCU 22.

For example, the endpoints 1-3 may remove the background image data by capturing participant images with a blue or green screen as a background and then analyze the resulting images in conjunction with depth information to isolate the participant body images. More specifically, a synthetic blue screen can be used in conjunction with an algorithm that analyzes different parameters of the background image. Alternatively, pattern recognition for recognizing faces and bodies may be used. Depth information for each pixel in an image may also be used to extract image data belonging to the background.

In addition, Chroma key, in which two images or frames may be mixed by removing a color (or a small color range) from one image (made transparent) to reveal another image behind it may also be used. Primatte uses a unique algorithm based on three multi-faced polyhedrons floating in RGB colorspace used to isolate color regions in the foreground image, and may also be used to separate participant images from background image information. As one of ordinary skill in the art will recognize other methods of separating images may also be used without departing from the scope of the present disclosure. As such, the above-described methods are merely exemplary and in no way limit this disclosure.

The extracted participant images are processed by the MCU 22 at step S62 to scale them to a same size, adjust color balance, contract and intensity. This processing is performed by comparing the participant image data received from each endpoint 1-3 and to mean values for the above parameters extracted from a combination of all of the participant images. parameters.

At step S62, received sound data from each endpoint 1-3 is interpreted to determine an endpoint 1-3 providing the highest sound level. The endpoint providing the highest sound level is then marked as an active endpoint, and one or more corresponding participant images are highlighted to indicate a current speaker(s). Highlighting of the participant images is accomplished by placing a border around the participant image, or bringing the participant image into the foreground, in front of all other participant images. Alternatively, the focus of participant images that are not highlighted may be softened. Further, when switching from one active endpoint 1-3 to another, a currently highlighted participant image may be faded out as the next participant image to be highlighted is faded in according to a predetermined time delay. As one of ordinary skill will recognize, other methods of highlighting a participant image may also be employed without departing from the scope of the present disclosure.

At step S63, the MCU 22 combines the participant image data to generate a merged data. If the number of participants is too great to fit the width of the monitor 25 without being overlapped, the participant images in the merged data are partly overlapped to accommodate the width of monitor 25. The MCU 22 also aligns the participant images horizontally.

At step S64, the MCU 22 transmits the merged data to at least one endpoint 1-3, and the endpoint 1-3 supplies the merged data to monitor 25 to display the participant images as if the participants were located in a same room.

The process described above is performed dynamically to continually adjust the merged data and corresponding image displayed on monitor 25 as participants joint and/or leave the video conference. For example, when one or more participants leave an ongoing conference, the images of the remaining participants are spaced further apart on the monitor 25. Conversely, the participant images are spaced closer together on the monitor 25 when more participants joint the video conference.

The colour balance, contrast and intensity from each endpoint is also dynamically adjusted by comparing video data received from each endpoint 1-3 and determining a mean value for each parameter. The participant images from each endpoint 1-3 are then adjusted according to the mean value before being merged. The method therefore compensates for varying light conditions at each endpoint 1-3.

Moreover, any processes, descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

Obviously, numerous modifications and variations of the present invention are possible in light of the above teachings. It is therefore to be understood that within the scope of the appended claims, the invention may be practiced otherwise than as specifically described herein.

The invention claimed is:

1. A method to cause a video conferencing system to display a plurality of participants, comprising:

receiving, at a multipoint control unit, video data including sound and image data from a plurality of endpoints connected to the multipoint control unit, the video data corresponding to participants located at each of the plurality of endpoints, at least one of the endpoints capturing video data corresponding to more than one participant;

extracting, at the multipoint control unit, participant image data from the sound and image data included in the video data;

processing, at the multipoint control unit, the extracted participant image data to have a same appearance;

combining, at the multipoint control unit, the processed participant image data to generate a merged image data of participants from other endpoints, the merged image data excluding surrounding background image data corresponding to each of the participants, images of the participants overlapping in the merged image data;

transmitting the merged image data from the multipoint control unit to a respective endpoint; and displaying, at a monitor of the respective endpoint, the merged image data received from the multipoint control unit, the monitor displaying participants from other endpoints as being located in a same room.

2. The method according to claim 1, further comprising: identifying, at the multipoint control unit, an endpoint with a highest sound level as an active endpoint.

3. The method according to claim 1, wherein the extracted image data corresponds to a body image of the participants without corresponding background imagery.

4. The method according to claim 1, wherein the participant image data is extracted from the video data using a synthetic blue or green screen and an algorithm to analyze background imagery and image depth information.

5. The method according to claim 1, wherein the participants are displayed aligned horizontally on the monitor, the horizontal alignment and overlapping dynamically varying according to changes in a number of participants in the video conference.

6. The method according to claim 1, wherein the processing of the extracted participant image data includes determining mean values for image size, color balance, contrast and intensity based on the extracted participant image data, and based on the mean values determined scaling each participant image to a same size, adjusting each participant image to a same color balance and adjusting each participant image to a same contrast and intensity.

7. The method according to claim 2, wherein a participant image from the active endpoint is highlighted on the monitor.

8. The method according to claim 7, wherein the participant image from the active endpoint is highlighted with borders.

9. The method according to claim 2, wherein participant images from endpoints other than the active endpoint are softened.

10. The method according to claim 2, wherein a participant image corresponding to the active endpoint is displayed in front of other participant images on the monitor.

11. The method according to claim 2, wherein a participant image corresponding to the active endpoint is faded out according to a predetermined delay, and a participant image corresponding to a next active endpoint is faded in according to the predetermined delay.

12. A video conferencing system for displaying a plurality of participants as being located in a single room, comprising:

a multipoint control unit configured to receive video data including sound and image data from a plurality of endpoints connected to the multipoint control unit, the video data corresponding to a plurality of participants respectively located at the plurality of endpoints, at least one of the endpoints capturing video data corresponding to more than one participant, the multipoint control unit extracting participant image data from the sound and image data and processing the extracted participant image data to have a same appearance; and at least one endpoint connected to the multipoint control unit and configured to display merged image data of the participants received from the multipoint control unit, the merged image data of the participants excluding background image data, the at least one endpoint providing the merged image data to a monitor to display the participants corresponding to the plurality of endpoints as being located in a same room, wherein images of the participants are overlapped in the merged image data.

13. The system according to claim 12, wherein the plurality of endpoints are configured to extract the participant image data before transmitting the video data to the multipoint control unit.

14. The system according to claim 12, wherein the MCU separates the extracted participant image data from background image data.

15. The system according to claim 14, wherein the image data is extracted by applying a blue or green screen behind each participant and analyzing corresponding depth information.

16. A multipoint control unit device for a video conferencing system comprising:

a receiving unit configured to receive video data including sound and image data from a plurality of endpoints, the sound and image data corresponding to participants respectively located at each of the plurality of endpoints, at least one of the endpoints capturing video data corresponding to more than one participant;

an extracting unit configured to extract participant image data from the sound and image data included in the video data;

an image processing unit configured to process the extracted participant image data to have a same appearance;

a combining unit configured to combine the processed participant image data into a merged participant image data without corresponding background image data, the merged participant image data causing the participants to appear located in a same room, images of the participants overlapping in the merged image data; and a transmitter configured to transmit the merged participant image data to at least one of the plurality of endpoints.

17. The multipoint control unit device according to claim 16, wherein the extracting unit extracts participant body image data from surrounding background image data, the extracted participant body image data being the extracted participant image data.

18. An endpoint device in a video conferencing system, comprising:
- an imaging device configured to capture video data of a participant and a surrounding background, the video data including sound and image data;
- an extraction unit configured to extract participant image information from the video data;
- a transmitter configured to transmit the extracted participant image information to a multipoint control unit;
- a receiver configured to receive, from the multipoint control unit, a merged participant image data formed by merging image data from a plurality of endpoints, at least one of the endpoints capturing video data corresponding to more than one participant, the merged participant image data excluding surrounding background image data, images of the participants overlapping in the merged image data; and
- a monitor configured to display the merged participant image data, participants corresponding to the merged participant image data being displayed as located in a same room.

19. The endpoint device according to claim 18, wherein the extracting unit extracts participant body image data from surrounding background image data, the extracted participant body image data being the extracted participant image data.

20. The endpoint device according to claim 18, wherein a blue or green screen is placed behind the participant, and the extracting unit extracts the participant image data using a predetermined algorithm to analyze image depth information.

21. A non-transitory computer-readable medium storing computer-readable instruction thereon, the computer-readable instructions when executed by a computer cause the computer to perform a method comprising:
- receiving, at a multipoint control unit, video data including sound and image data from a plurality of endpoints connected to the multipoint control unit, the video data corresponding to participants located at each of the plurality of endpoints, at least one of the endpoints capturing video data corresponding to more than one participant;
- extracting participant image data from the sound and image data included in the video data;
- processing the extracted participant image data to have a same appearance;
- combining the processed participant image data to generate a merged image data of participants from other endpoints, the merged image data excluding surrounding background image data corresponding to each of the participants, images of the participants overlapping in the merged image data;
- transmitting the merged image data from the multipoint control unit to a respective endpoint; and
- displaying the merged image data received from the multipoint control unit on a monitor, the monitor displaying participants from other endpoints as being located in a same room.

* * * * *